(12) United States Patent
Cameron

(10) Patent No.: US 12,083,369 B2
(45) Date of Patent: Sep. 10, 2024

(54) HANDSFREE, BODY-MOUNTED APPARATUS FOR SUPPORTING HIGH-PRESSURE HOSES

(71) Applicant: John-Thomas Cameron, Terrell, NC (US)

(72) Inventor: John-Thomas Cameron, Terrell, NC (US)

( * ) Notice: Subject to any disclaimer, the term of this patent is extended or adjusted under 35 U.S.C. 154(b) by 0 days.

(21) Appl. No.: 17/821,271

(22) Filed: Aug. 22, 2022

(65) Prior Publication Data
US 2023/0054601 A1 Feb. 23, 2023

Related U.S. Application Data

(60) Provisional application No. 63/260,473, filed on Aug. 20, 2021.

(51) Int. Cl.
*A62C 33/04* (2006.01)
*A45F 3/04* (2006.01)
*A45F 3/10* (2006.01)

(52) U.S. Cl.
CPC ............... *A62C 33/04* (2013.01); *A45F 3/04* (2013.01); *A45F 3/10* (2013.01); *A45F 2003/045* (2013.01); *A45F 2200/0566* (2013.01)

(58) Field of Classification Search
CPC . A62C 33/04; A62C 15/00; A45F 3/04; A45F 3/10; A45F 2003/045; A45F 2200/0566; A45F 2200/05; A01G 25/14
See application file for complete search history.

(56) References Cited

U.S. PATENT DOCUMENTS

| | | | | |
|---|---|---|---|---|
| 1,902,548 | A | * | 3/1933 | Fenwick, Jr. ......... B05B 9/0426 383/88 |
| 2,942,822 | A | | 6/1960 | Crow |
| 3,140,800 | A | * | 7/1964 | Henderson ............... A01C 7/02 222/196 |
| 3,223,172 | A | * | 12/1965 | Moss ........................ A45F 3/08 239/152 |
| 3,941,342 | A | | 3/1976 | Bradshaw |
| 4,858,797 | A | | 8/1989 | Rabska |
| 5,195,596 | A | | 3/1993 | Mount, III et al. |
| 5,433,288 | A | | 7/1995 | James |
| 5,579,966 | A | | 12/1996 | Krumweide et al. |
| 5,979,840 | A | | 11/1999 | Hollister et al. |

(Continued)

FOREIGN PATENT DOCUMENTS

| | | | | |
|---|---|---|---|---|
| CN | 202876164 | U | * 4/2013 | |
| CN | 106181903 | A | * 12/2016 | ................ B25F 5/00 |

(Continued)

*Primary Examiner* — Kimberly T Wood
(74) *Attorney, Agent, or Firm* — Dunlap Bennett & Ludwig, PLLC

(57) ABSTRACT

An apparatus and system for supporting a high-pressure hose is disclosed. The apparatus includes a brace and a bracket. The brace includes a main body portion, a pair of shoulder straps connected to the main body portion, and a midsection strap connected to the main body portion. The bracket is rotatably mounted to an upper end of the main body portion and includes a pivotal hose clamping portion at an end thereof, In use, the brace, the bracket, and the pivotal hose clamping support the high-pressure hose, reducing the effort required by the operator to support the hose.

7 Claims, 4 Drawing Sheets

(56) References Cited

U.S. PATENT DOCUMENTS

| | | | |
|---|---|---|---|
| 6,158,670 A * | 12/2000 | Blocker | B05B 15/63 |
| | | | 239/152 |
| 6,688,538 B2 | 2/2004 | Nemoto et al. | |
| 8,052,186 B2 | 11/2011 | OBrien et al. | |
| 8,356,385 B2 | 1/2013 | Webb | |
| 8,381,874 B1 | 2/2013 | Blemel | |
| 9,204,730 B2 * | 12/2015 | Brown | A47C 7/52 |
| 9,889,554 B2 * | 2/2018 | Van Engelhoven | B65H 1/10 |
| 10,071,271 B1 * | 9/2018 | Blocker | A62C 33/04 |
| 10,327,536 B2 * | 6/2019 | Pruess | H01M 50/247 |
| 10,555,646 B2 | 2/2020 | Pickett | |
| 10,569,413 B2 * | 2/2020 | Angold | A61H 1/0274 |
| 11,654,546 B2 * | 5/2023 | Van Engelhoven | B25H 1/10 |
| | | | 248/118 |
| 2007/0237572 A1 * | 10/2007 | Thiessen | F16M 11/2014 |
| | | | 403/96 |
| 2009/0026236 A1 | 1/2009 | Krause | |
| 2014/0158839 A1 * | 6/2014 | Doyle | A61F 5/013 |
| | | | 248/118 |
| 2015/0076196 A1 * | 3/2015 | Brown | F16M 13/04 |
| | | | 224/271 |
| 2015/0316204 A1 * | 11/2015 | Doyle | F16M 13/04 |
| | | | 248/118 |
| 2016/0081871 A1 * | 3/2016 | Doyle | A61H 1/0274 |
| | | | 601/33 |
| 2016/0108924 A1 | 4/2016 | Conrad et al. | |
| 2019/0083350 A1 * | 3/2019 | Weidner | A61F 5/026 |
| 2020/0077773 A1 | 3/2020 | Davic et al. | |

FOREIGN PATENT DOCUMENTS

| | | | |
|---|---|---|---|
| JP | 09192254 A | * | 7/1997 |
| KR | 200422304 Y1 | * | 7/2006 |

\* cited by examiner

HANDSFREE, BODY-MOUNTED APPARATUS FOR SUPPORTING HIGH-PRESSURE HOSES

CROSS-REFERENCE TO RELATED APPLICATION

This application claims the benefit of priority of U.S. provisional application No. 63/260,473, filed Aug. 20, 2021, the contents of which are herein incorporated by reference.

BACKGROUND OF THE INVENTION

The present invention relates to hoses and, more particularly, to a handsfree support solution for watering when using hoses.

The use of high-pressure hoses is often a labor-intensive and time-consuming process across many industries, including, but not limited to, turf management, parks and recreation, emergency services, and the like. This process is inefficient and causes physical strain on the operator because of the need for the operator to support the hose by hand.

In general, the current process of holding a high-pressure hose requires great physical exertion and a lack of precision and efficiency. The current process often requires many individuals for the watering and an extended amount of time to achieve the desired outcome.

As can be seen, there is a need for a hands-free hose support apparatus that solves these above-described problems.

SUMMARY OF THE INVENTION

In one aspect of the present invention, an apparatus for supporting a high-pressure hose is disclosed, with the apparatus comprising: a brace configured to be worn by an operator, the brace comprising: a main body portion; a pair of shoulder straps connected to the main body portion; and a midsection strap connected to the main body portion; and a bracket rotatably mounted to an upper end of the main body portion and comprising a pivotal hose clamping portion at an end thereof, the brace, the bracket, and the pivotal hose clamping portion being configured to support the high-pressure hose.

In another aspect of the present invention, a system is disclosed that includes: a high-pressure hose; an apparatus supporting the high-pressure hose, the apparatus including: a brace configured to be worn by an operator, the brace including: a main body portion; a pair of shoulder straps connected to the main body portion; and a midsection strap connected to the main body portion; and a bracket rotatably mounted to an upper end of the main body portion and comprising a pivotal hose clamping portion at an end thereof, the brace, the bracket, and the pivotal hose clamping portion supporting the high-pressure hose.

These and other features, aspects and advantages of the present invention will become better understood with reference to the following drawings, description, and claims.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
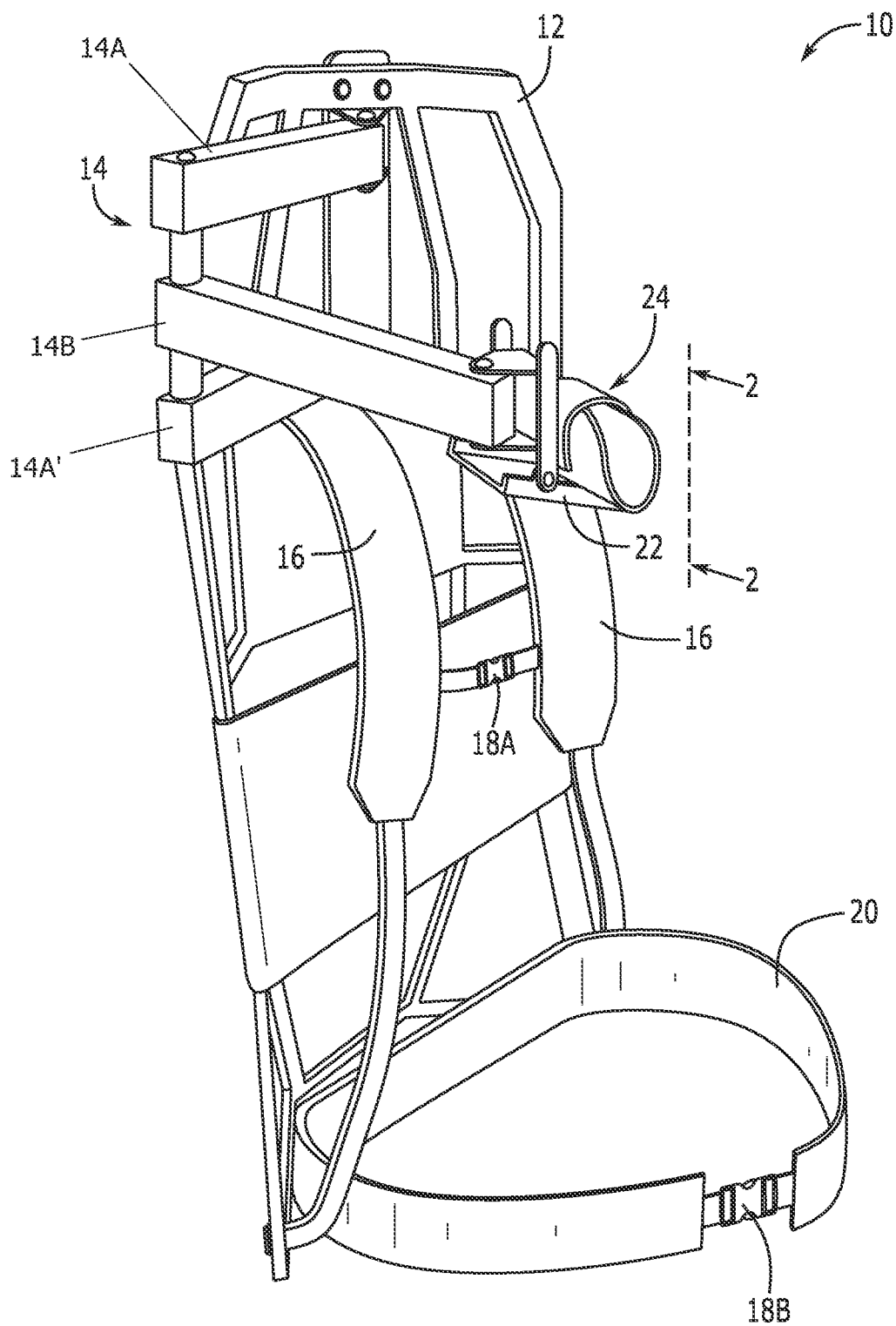
FIG. 1 is a front perspective view of an embodiment of the present invention.
Figure 2:
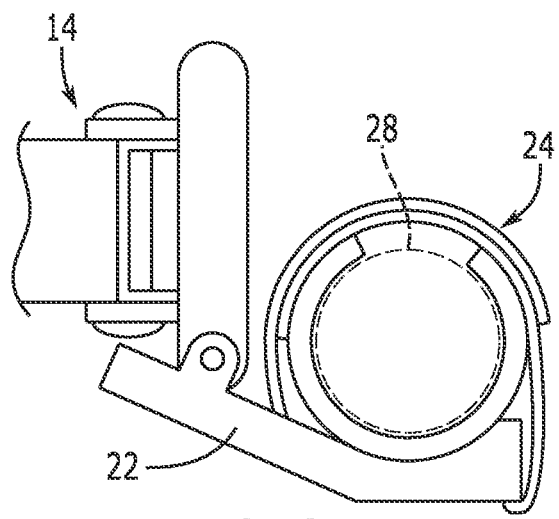
FIG. 2 is a detail side elevation view of the embodiment of the present invention, indicated by the line 2-2 of FIG. 1.
Figure 3:
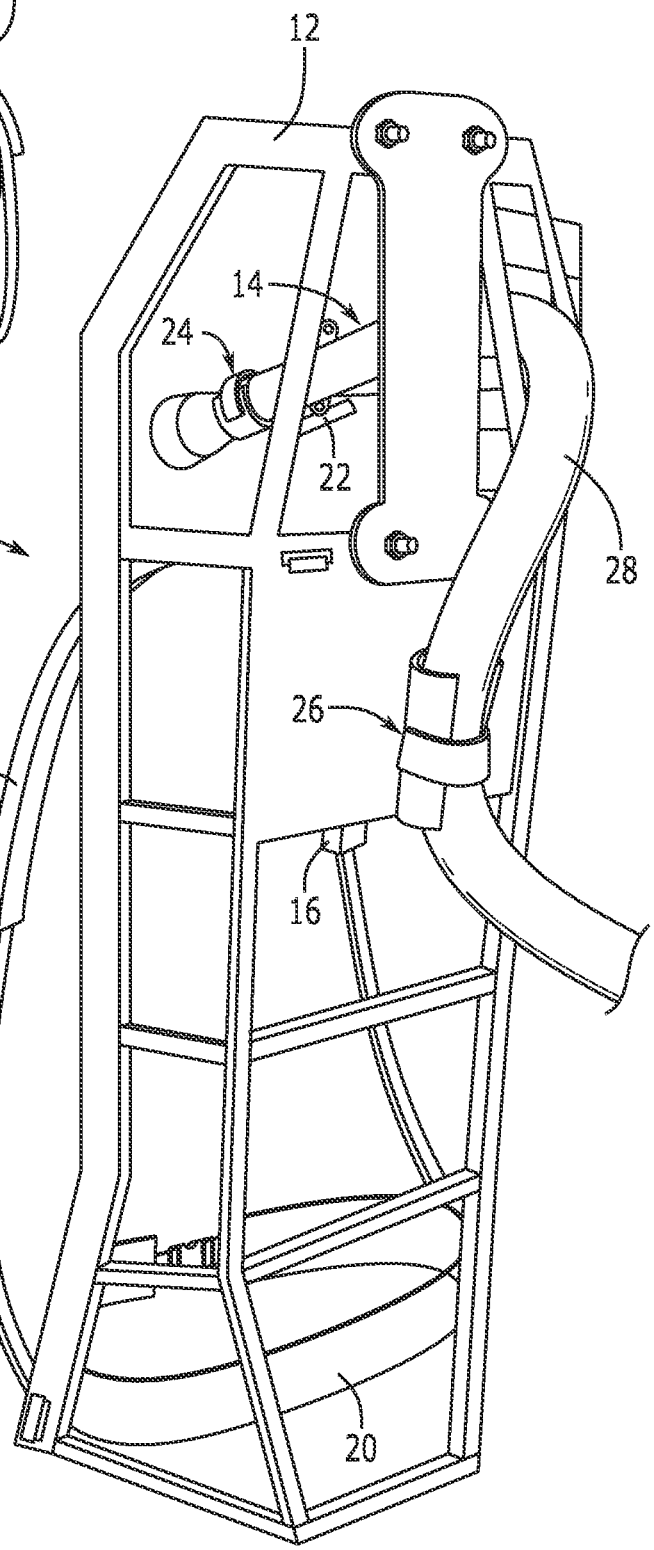
FIG. 3 is a rear perspective view of the embodiment of the present invention, showing a mounting of the present invention.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details. For the purpose of clarity, technical material that is known in the technical fields related to the present invention has not been described in detail so that the present invention is not unnecessarily obscured.

Broadly, an embodiment of the present invention provides a high-pressure hose support. The present invention provides the operator with a greater degree of precision by allowing the operator to comfortably target specific areas of need in a timelier manner. The present invention gives the operator the ability to maneuver the hose with improved body mechanics, preventing physical strain. Embodiments of the present invention are the only products that provide a wearable support for hoses that can be utilized in many industries.

The present invention functions as a support that allows an individual to operate the high-pressure hose and alleviates the constant pulling and pressures while maneuvering the hose. By keeping the hose in a comfortable position, it saves the operator time that would otherwise be spent repositioning the hose, increasing efficiency of the operator.

Referring now to FIGS. 1-5, a high-pressure hose support 10 generally includes two primary components: a brace that is similar in form and function to a backpack that an operator wears; and a bracket/swing arm 14 that is secured to the brace and can be positioned to hold differently sized hoses. As shown in FIG. 1, the brace includes a main body portion 12, a pair of adjustable shoulder straps 16 (which are connected by a first adjustable clip 18A), and an adjustable midsection strap 20 that clips via a second adjustable clip 18B for securement.

As shown in FIG. 1, the bracket/swing arm 14 includes a pair of first arms 14A, 14A' hingedly coupled to the main body portion and a second arm 14B hingedly coupled to the first arms 14A, 14A'. The bracket 14 also includes a pivotal hose clamping portion 22 (which includes hook and loop fastener straps 24 for securement of the hose 28) at an end thereof (hingedly coupled to the second arm 14B) to retain the hose 28 in place, and the main body portion 12 further includes a hose bracket 26 (formed from, for example, hook and loop fasteners) that the hose 28 extends through.

Figure 4:
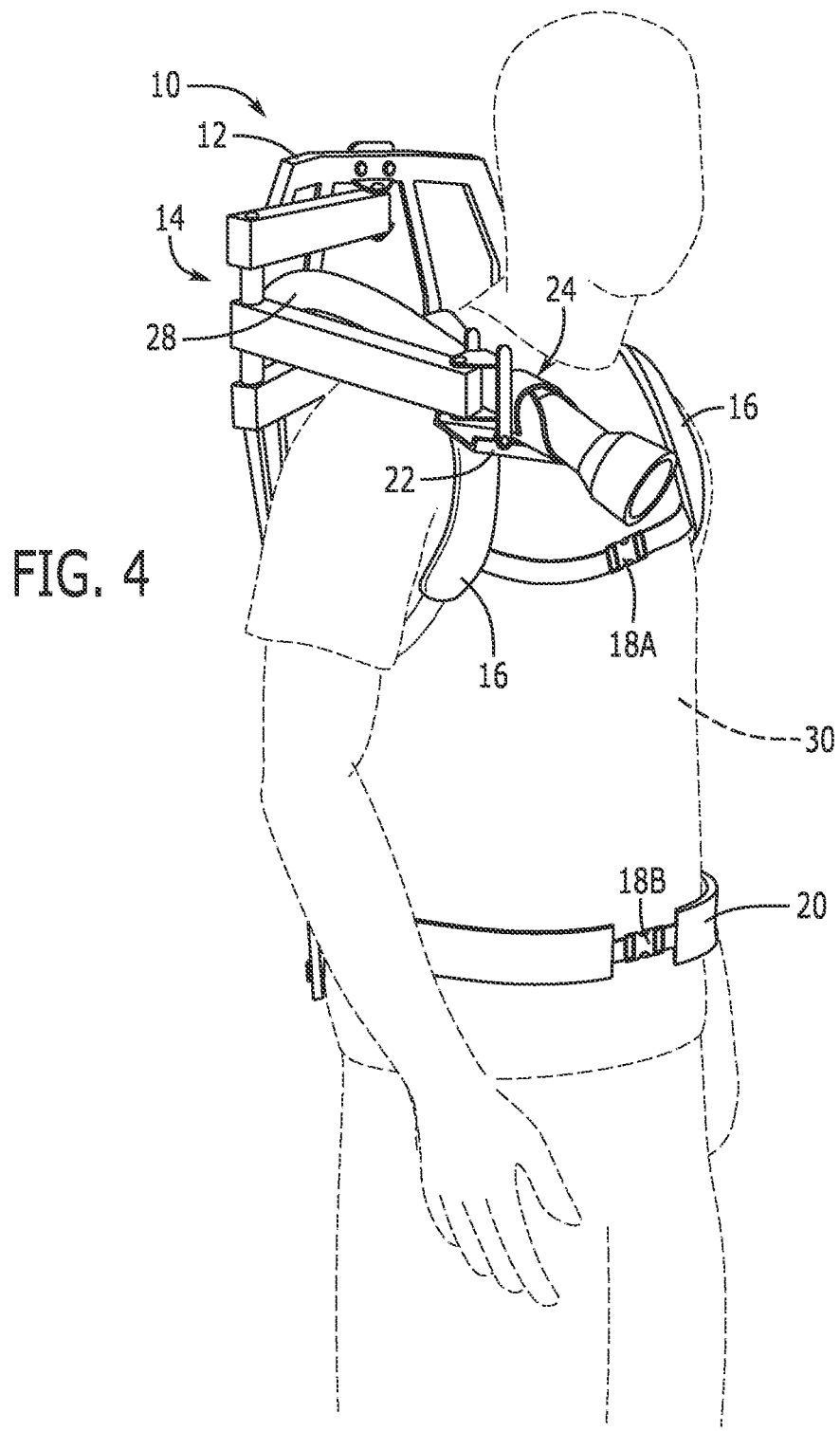
FIG. 4 is a front perspective view of the embodiment of the present invention, in use.
Figure 5:
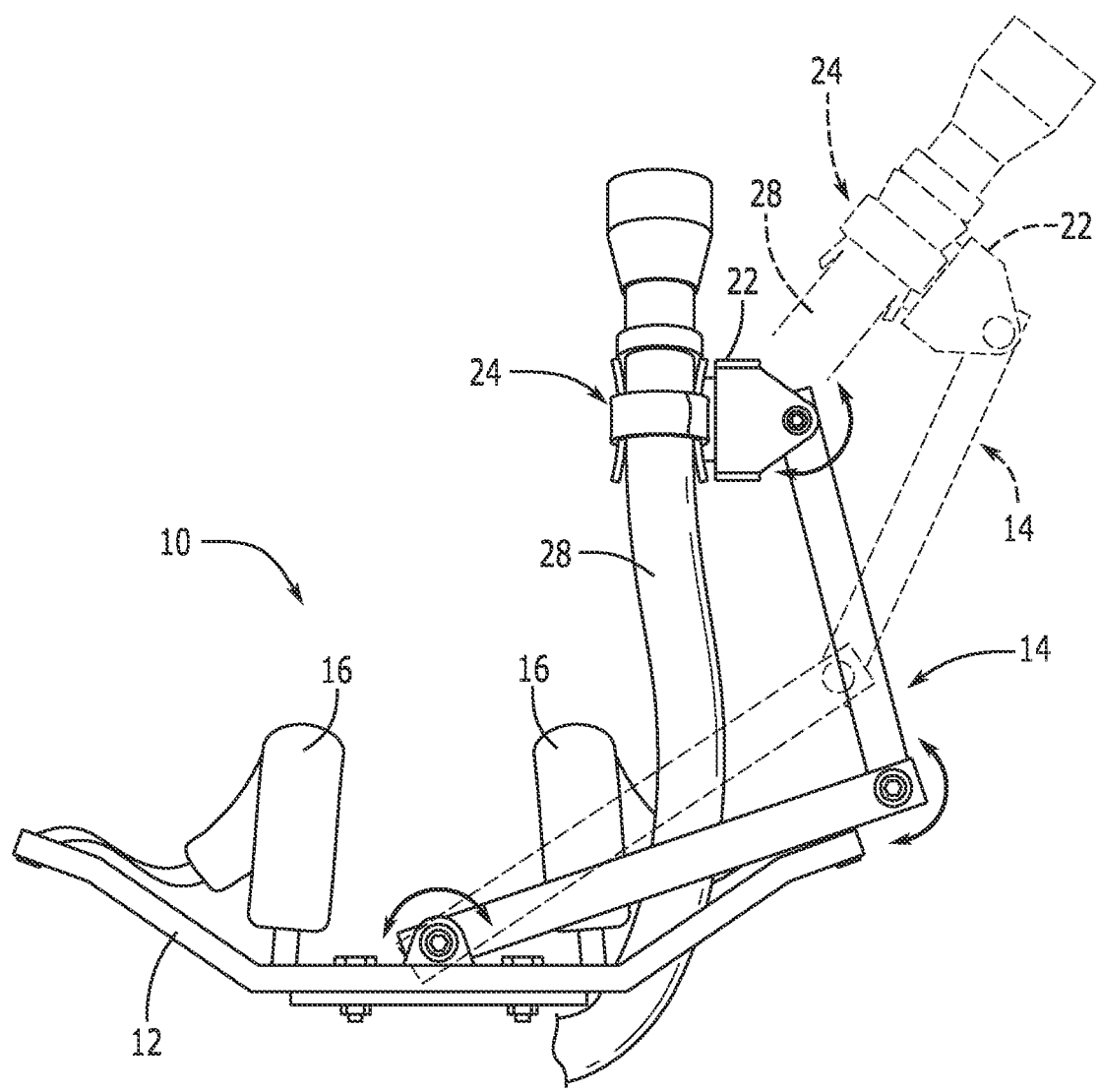
FIG. 5 is a detail plan view showing the articulation of the embodiment of the present invention.

In use, the hose 28 is routed through the hose bracket 26 on the main body portion 12, passing through an opening that is proximate the bracket 14 (see FIG. 3), and finally securing to the hose clamping portion 22 that is at a distal end of the bracket 14. The bracket 14 is angularly repositionable (see the arrows and phantom lines in FIG. 5) by pivoting relative to the main body 12 and is fit in such a manner that it is frictionally held in place once repositioned. After those steps have occurred, an operator 30 may put the brace/backpack on to manipulate and use the hose 28, as shown in FIGS. 4 and 5, for example.

To summarize, the present invention combines a bracket/swing arm and a brace to form a high-pressure hose support to operate high-pressure hoses. The bracket/swing arm is adjustable to fit a multitude of different hose sizes. This bracket/swing arm is directly connected to the brace that the operator will wear, similar to a backpack fashion, and is secured in place at the chest and hip with adjustable clips. These two primary elements, in combination, allow the operator to position a hose with great precision by creating angles and support needed when using high pressure systems, which would otherwise result in a great amounted resistance for the operator if not using said high-pressure hose support.

In an exemplary embodiment, the hose support may be used as follows. An operator will use this hose support by following the previously mentioned steps. The operator will need to first identify the hose that will be in use. The operator will then put the hose inside the bracket and adjust it to secure the hose in place, which will sit just above the shoulder. The operator will then place the brace on, similar to putting on a backpack, and secure it using a clip located at the chest and hip area. These chest/hip clips can be adjusted to fit the individual to size. Once secured, the operator will begin use of support to the desired effect (i.e., spray whatever area/location as needed).

Embodiments of the present invention can be utilized to direct water for many industries/fields (including for applications that require low-pressure water flow), as previously mentioned, but could also be used to direct other materials, such as concrete, hydro-mulch, chemical components, and the like.

In an exemplary embodiment, the hose support may be made or fabricated as follows. The various components may be formed from appropriate materials, such as but not limited to, rubber, plastic, fabric, and metal, and may be shaped to resemble the embodiment, as shown in FIGS. 1-5, or differently such that the same functionality is achieved. Fasteners (such as bolts) will hold the components in place.

The present invention has been described in terms of exemplary embodiments solely for the purpose of illustration. Persons skilled in the art will recognize from this description that the invention is not limited to the embodiments described but may be practiced with modifications and alterations limited only by the spirit and scope of the appended claims.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. The term "substantially" shall be interpreted to mean completely and/or nearly completely. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted. Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An apparatus for supporting a high-pressure hose, the apparatus comprising:
   a brace configured to be worn by an operator, the brace comprising:
      a main body portion having an upper end, lower end, a front side, a back side, and an opening from the front side to the back side positioned adjacent the upper end;
      a pair of shoulder straps connected to the main body portion; and
      a midsection strap connected to the main body portion;
   a hose bracket coupled to the back side of the main body portion; and
   a bracket rotatably mounted to the front side of the main body portion adjacent to the upper end of the main body portion and comprising a pivotal hose clamping portion at an end thereof, wherein:
      the hose bracket and the pivotal hose clamping portion are configured to couple to the high-pressure hose and position the high-pressure hose through the opening, and
      the brace, the bracket, and the pivotal hose clamping portion are configured to support the high-pressure hose.

2. The apparatus of claim 1, wherein the hose bracket comprises a hook and loop fastener.

3. The apparatus of claim 1, wherein the bracket comprises a pair of first arms pivotally coupled to the main body portion and a second arm pivotally coupled to the pair of first arms, with the pivotal hose clamping portion being coupled to the second arm.

4. A system comprising:
   a high-pressure hose; and
   an apparatus supporting the high-pressure hose, the apparatus comprising:
      a brace configured to be worn by an operator, the brace comprising:

a main body portion having an upper end, lower end, a front side, a back side, and an opening from the front side to the back side positioned adjacent the upper end;

a pair of shoulder straps connected to the main body portion; and a midsection strap connected to the main body portion;

a hose bracket coupled to the back side of the main body portion; and a bracket rotatably mounted to the front side of the main body portion adjacent to the upper end of the main body portion and comprising a pivotal hose clamping portion positioned at an end of the bracket, wherein:

the high-pressure hose is coupled to hose bracket and the pivotal hose clamping portion such that the high-pressure hose is positioned through the opening, and the brace, the bracket, and the pivotal hose clamping portion support the high-pressure hose.

5. The system of claim 4, wherein the hose bracket comprises a hook and loop fastener.

6. The system of claim 4, wherein the bracket comprises a pair of first arms pivotally coupled to the main body portion and a second arm pivotally coupled to the pair of first arms, with the pivotal hose clamping portion being coupled to the second arm.

7. The system of claim 4, wherein the opening is one of a plurality of openings and is positioned adjacent to the upper end of the main body portion.

* * * * *